United States Patent
Kim et al.

(10) Patent No.: US 9,888,062 B2
(45) Date of Patent: Feb. 6, 2018

(54) DISTRIBUTED STORAGE SYSTEM INCLUDING A PLURALITY OF PROXY SERVERS AND METHOD FOR MANAGING OBJECTS

(75) Inventors: Mi-Jeom Kim, Gyeonggi-do (KR); Hyo-Min Kim, Seoul (KR); Chang-Sik Park, Seoul (KR); Jin-Kyung Hwang, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 1174 days.

(21) Appl. No.: 13/336,135

(22) Filed: Dec. 23, 2011

(65) Prior Publication Data

US 2012/0166611 A1 Jun. 28, 2012

(30) Foreign Application Priority Data

Dec. 24, 2010 (KR) ........................ 10-2010-0134841

(51) Int. Cl.
*H04L 29/06* (2006.01)
*H04L 29/08* (2006.01)
*H04L 12/26* (2006.01)

(52) U.S. Cl.
CPC ...... *H04L 67/1006* (2013.01); *H04L 67/1002* (2013.01); *H04L 67/1021* (2013.01); *H04L 67/125* (2013.01); *H04L 67/28* (2013.01); *H04L 43/0817* (2013.01); *H04L 67/1097* (2013.01)

(58) Field of Classification Search
CPC ... H04L 67/125; H04L 67/28; H04L 67/1002; H04L 67/1097; H04L 43/0817; H04L 67/1021; H04L 67/1006
See application file for complete search history.

(56) References Cited

U.S. PATENT DOCUMENTS

| | | | |
|---|---|---|---|
| 5,315,601 A | 5/1994 | Lee et al. | |
| 6,438,652 B1 * | 8/2002 | Jordan et al. | 711/120 |
| 7,650,328 B2 | 1/2010 | Hori et al. | |
| 7,739,233 B1 | 6/2010 | Ghemawat et al. | |
| 7,823,009 B1 | 10/2010 | Tormasov et al. | |

(Continued)

FOREIGN PATENT DOCUMENTS

| | | |
|---|---|---|
| JP | 2008-059438 A | 3/2008 |
| KR | 10-1993-0007928 B1 | 8/1993 |

(Continued)

*Primary Examiner* — Aaron Strange
(74) *Attorney, Agent, or Firm* — IP Legal Services, LLC

(57) ABSTRACT

A distributed storage system including a plurality of proxy server and a method for managing objects. The distributed storage system may include a plurality of data nodes, a plurality of proxy server, and a global load balancer. Each one of the plurality of data nodes may be configured to perform at least one management operation and output an operation result. Each one of the plurality of proxy servers may be configured to perform operations for controlling the plurality of data nodes to perform the at least one management operation in response to an operation request from a respective client. The global load balancer may be configured to select one proxy server from the plurality of proxy servers and allocate the selected proxy server to the respective client as the responsible proxy server. The respective client may perform the management operation through the allocated responsible proxy server.

10 Claims, 4 Drawing Sheets

(56) References Cited

U.S. PATENT DOCUMENTS

| | | |
|---|---|---|
| 7,853,770 B2 | 12/2010 | Tajima et al. |
| 8,103,636 B2 | 1/2012 | Lee et al. |
| 2002/0091705 A1 | 7/2002 | Mitomi et al. |
| 2004/0064633 A1 | 4/2004 | Oota |
| 2004/0088297 A1* | 5/2004 | Coates .................. G06F 3/0613 |
| 2005/0125456 A1 | 6/2005 | Hara et al. |
| 2005/0251855 A1* | 11/2005 | Brandstatter ....... H04L 63/0209 |
| | | 726/12 |
| 2005/0256923 A1 | 11/2005 | Adachi |
| 2005/0257002 A1* | 11/2005 | Nguyen ...................... 711/114 |
| 2006/0031230 A1* | 2/2006 | Kumar ............................ 707/10 |
| 2006/0047751 A1 | 3/2006 | Chen et al. |
| 2006/0069828 A1 | 3/2006 | Goldsmith |
| 2006/0277596 A1* | 12/2006 | Calvert ............... H04L 63/0218 |
| | | 726/3 |
| 2007/0078959 A1* | 4/2007 | Ye ................................. 709/223 |
| 2007/0118630 A1* | 5/2007 | Hashimoto et al. .......... 709/223 |
| 2007/0300220 A1 | 12/2007 | Seliger et al. |
| 2008/0005184 A1* | 1/2008 | Myllyla et al. ............... 707/200 |
| 2008/0021935 A1 | 1/2008 | Geelen et al. |
| 2008/0317068 A1 | 12/2008 | Sagar et al. |
| 2009/0106255 A1* | 4/2009 | Lacapra ............. G06F 11/1076 |
| 2009/0144579 A1 | 6/2009 | Swanson |
| 2009/0171891 A1 | 7/2009 | Nochimowski et al. |
| 2009/0171911 A1 | 7/2009 | Nochimowski et al. |
| 2009/0172050 A1 | 7/2009 | Nochimowski et al. |
| 2009/0172217 A1 | 7/2009 | Nochimowski et al. |
| 2009/0172274 A1 | 7/2009 | Nochimowski et al. |
| 2009/0172275 A1 | 7/2009 | Nochimowski et al. |
| 2009/0172276 A1 | 7/2009 | Nochimowski et al. |
| 2009/0172400 A1 | 7/2009 | Rave et al. |
| 2009/0172694 A1 | 7/2009 | Nochimowski et al. |
| 2010/0058341 A1 | 3/2010 | Jung et al. |
| 2010/0076933 A1 | 3/2010 | Hamilton et al. |
| 2010/0161759 A1 | 6/2010 | Brand |
| 2010/0274762 A1 | 10/2010 | Murphy et al. |
| 2010/0318609 A1 | 12/2010 | Lahiri et al. |
| 2010/0325199 A1 | 12/2010 | Park et al. |
| 2010/0333116 A1 | 12/2010 | Prahlad et al. |
| 2011/0202741 A1 | 8/2011 | Tajima et al. |
| 2012/0078915 A1* | 3/2012 | Darcy ........................... 707/747 |
| 2012/0185641 A1 | 7/2012 | Nochimowski et al. |
| 2014/0379966 A1 | 12/2014 | Nochimowski et al. |

FOREIGN PATENT DOCUMENTS

| | | |
|---|---|---|
| KR | 10-1993-0023826 A | 12/1993 |
| KR | 10-2001-0091593 A | 10/2001 |
| KR | 10-2002-0050160 A | 6/2002 |
| KR | 10-2003-0070797 A | 9/2003 |
| KR | 10-2004-0028594 A | 4/2004 |
| KR | 10-2005-0033615 A | 4/2005 |
| KR | 10-2007-0012544 A | 1/2007 |
| KR | 10-2007-0032734 A | 3/2007 |
| KR | 10-0719285 B1 | 5/2007 |
| KR | 10-2007-0067069 A | 6/2007 |
| KR | 10-2007-0108133 A | 11/2007 |
| KR | 10-2009-0036276 A | 4/2009 |
| KR | 10-2009-0062747 A | 6/2009 |
| KR | 10-0923394 B1 | 10/2009 |
| KR | 10-0931260 B1 | 12/2009 |
| KR | 10-2010-0025980 A | 3/2010 |
| KR | 10-2010-0055297 A | 5/2010 |
| KR | 10-2010-0058786 A | 6/2010 |
| KR | 10-2010-0060304 A | 6/2010 |
| KR | 10-2010-0060715 A | 6/2010 |
| KR | 10-2010-0069234 A | 6/2010 |
| KR | 10-2010-0070443 A | 6/2010 |
| KR | 10-2010-0073154 A | 7/2010 |
| KR | 10-2010-0092850 A | 8/2010 |
| KR | 10-2010-0107479 A | 10/2010 |
| KR | 10-0985169 B1 | 10/2010 |
| KR | 10-2010-0122197 A | 11/2010 |
| KR | 10-2010-0137323 A | 12/2010 |
| KR | 10-1023585 B1 | 3/2011 |

* cited by examiner

DISTRIBUTED STORAGE SYSTEM INCLUDING A PLURALITY OF PROXY SERVERS AND METHOD FOR MANAGING OBJECTS

CROSS REFERENCE TO PRIOR APPLICATIONS

The present application claims priority under 35 U.S.C. § 119 to Korean Patent Application No. 10-2010-0134841 (filed on Dec. 24, 2010), which is hereby incorporated by reference in its entirety.

FIELD OF THE INVENTION

Apparatuses and methods relate to a distributed storage system including a plurality of proxy server for effectively providing a distributed storage service in a cloud computing environment.

BACKGROUND OF THE INVENTION

Cloud computing may be referred to as a service that provides various information technology (IT) resources distributed over an Internet. The most common cloud computing service models may include Infrastructure as a Service (IaaS), Platform as a Service (PaaS), and Software as a Service (SaaS). The IaaS may provide hardware infrastructure as a service. The PaaS may provide application development and execution platform as a service. The SaaS may provide applications as a service.

The IaaS may further include many sub_service categories. Mainly, the IaaS may include a storage service and a computing service, which provide computing resources in a form of a virtual machine. Such a storage service may be provided by a distributed storage system. The distributed storage system may virtually create a storage pool using low-profiled hardware distributed over a network. Such a distributed storage system may dynamically and flexibly provide a shared storage space to users according to abruptly varying service demands. The distributed storage system may commonly employ an object-based storage scheme. The object-based storage scheme may be a typical cloud storage service scheme. The object-based storage scheme may allow each physical storage device to manage own storage spaces. The object-based storage scheme may improve overall performance of the distributed storage system and allow the distributed storage system to easily expand a storage capability. Furthermore, data may be safely shared independently from related platforms.

In case of a typical distributed storage system, the large number of clients may refer to the same proxy server to access a plurality of data nodes. Accordingly, a processing load of the proxy server significantly increases as the number of the clients and the data nodes increase. Particularly, the proxy server may receive requests from clients and deliver the requests to data nodes. The proxy server may receive results of requested operations from the data nodes in response to the requests and deliver the results of the requested operation to the clients. As described above, the proxy server may have a great processing load for processing the requests from a plurality of clients and delivering the results of the requested operations to the clients. Accordingly, a distributed storage service may be delayed due to the high processing load of the proxy server.

Furthermore, when a single proxy server malfunctions due to errors, an entire distributed storage system may fail. That is, the typical distributed storage system may have one point of failure problem. In addition, the typical distributed storage system cannot be expanded more than a processing capacity of a single proxy server. Therefore, there is a need for developing a distributed storage system including multiple proxy servers in order to overcome the above described problems.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In embodiments, a distributed storage system may include a plurality of proxy servers. In embodiments, a global load balancer may allocate one of a plurality of proxy servers to a respective client as a responsible proxy server and the respective client may perform at least one management operation through the responsible proxy server. In embodiments, a responsible proxy server may update a metadata based on a result of performing at least one management operation. The metadata is stored and managed by a plurality of metadata servers.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
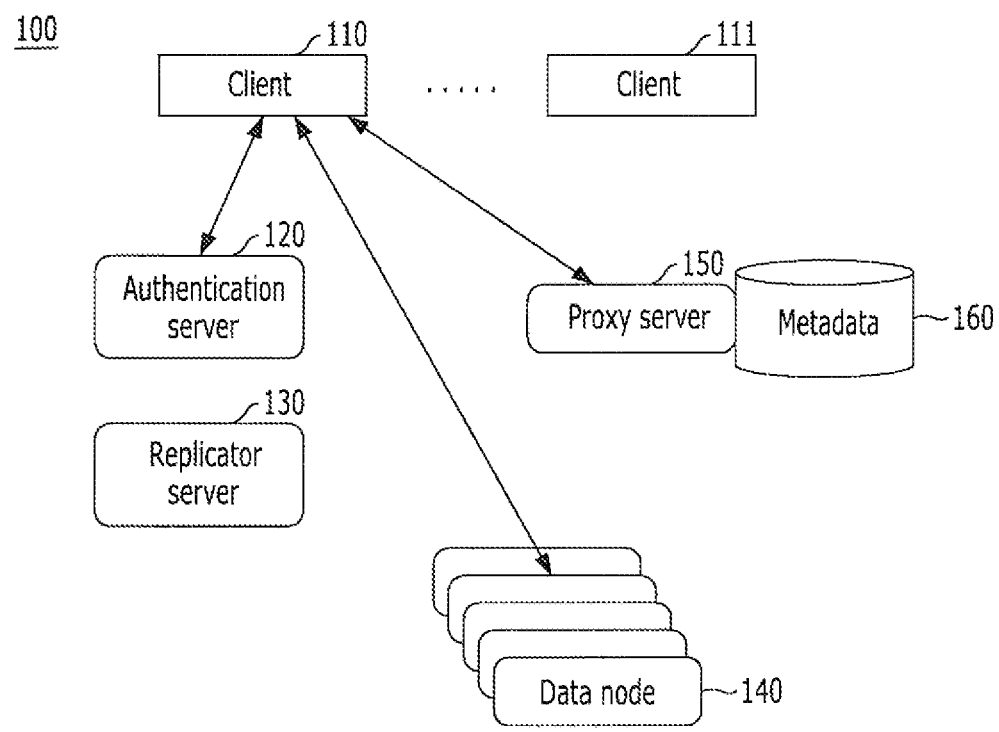
FIG. 1 illustrates a typical distributed storage system.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1 illustrates a typical distributed storage system.

Referring to FIG. 1, a typical distributed storage system 100 may include a plurality of clients 110 and 111, an authentication server 120, a replicator server 130, a plurality of data nodes 140, a proxy server 150, and a metadata database 160.

The authentication server 120 may authenticate the plurality of clients 110 and 111 accessing the typical distributed storage system 100. The proxy server 150 may be referred to as a master server. The proxy server 150 may process various requests from the clients 110 and 111. The metadata database 160 may store and maintain metadata. The metadata may include information on physical locations of objects. The plurality of data nodes 140 may store and manage actual objects. The replicator server 130 may manage object replication.

At an initial stage, the clients 110 and 111 are authenticated through the authentication server 120. After the authentication process is completed, the clients 110 and 111 may request the proxy server 150 to send information on the data nodes 140 that store and manage desired objects. The proxy server 150 may request a respective data node 140 to perform a desired operation based on the metadata in response to a request from the clients 110 and 111. The data node 140 may perform the requested operation and transmit the operation result to the clients 110 and 111 through the proxy server 150. In addition, the data node 140 may directly provide the operation result to the clients 110 and 111, without passing through the proxy server 150. Since the data nodes 140 directly communicate with the clients 110 and 111, delay or data traffic may be reduced. However, the complexity of the data nodes 140 may be increased because all data nodes need to have client interfaces. Furthermore, the same objects may be redundantly stored in more than two data nodes.

In the typical distributed storage system, the large number of clients may refer to the same proxy server to access a plurality of data nodes. Accordingly, a processing load of the proxy server significantly increases as the number of the clients and the data nodes increase. The proxy server may have a great processing load for processing requests from a plurality of clients and delivering the results of the requested operations to the clients. Accordingly, a distributed storage service may be delayed due to the high processing load of the proxy server. Furthermore, when a single proxy server malfunctions due to errors, an entire distributed storage system may fail. That is, the typical distributed storage system may have one point of failure problem. In addition, the typical distributed storage system cannot be expanded more than a processing capacity of a single proxy server.

In order to overcome such disadvantages of the typical distributed storage system, a distributed storage system in accordance with embodiments may include a plurality of proxy servers. Hereinafter, the distributed storage system in accordance with embodiments will be described, in detail, with reference to FIG. 2.

Figure 2:
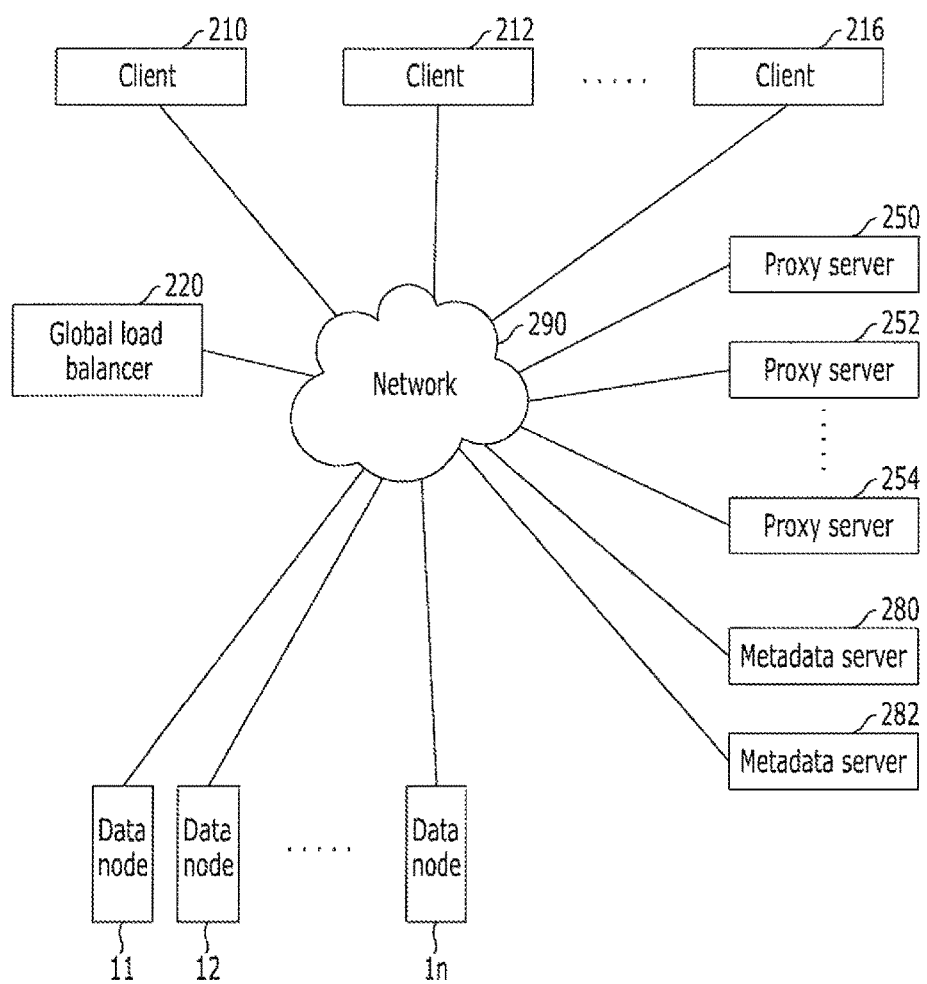
FIG. 2 illustrates a distributed storage system including a plurality of proxy servers, In accordance with embodiments.

FIG. 2 illustrates a distributed storage system including a plurality of proxy servers, in accordance with embodiments. Distributed storage system 200, in accordance with embodiments, may include plurality of clients 210 to 216, plurality of data nodes 11 to 1n, plurality of proxy servers 250 to 254, and global load balancer 220. Plurality of clients 210 to 216 and plurality of data nodes 11 to 1n may be coupled through network 290. Clients 210 to 216 may be user equipment accessing distributed storage system 200. Distributed storage system 200 may further include plurality of metadata databases 280 and 282, in accordance with embodiments.

In accordance with embodiments, global load balancer 220 may allocate one of plurality of proxy servers 250 to 254 to plurality of clients 210 to 216, respectively. Global load balancer 220 may consider a location and a processing load of each one of proxy servers 250 to 254 for the allocation of proxy servers 250 to 254. Furthermore, global load balancer 220 may authenticate plurality of clients 210 to 216 as an authentication server. In accordance with embodiments, global load balancer 220 may manage information on locations of proxy servers 250 to 254 and the number of clients allocated to each proxy server.

For example, distributed storage system 200 may receive a request for performing a management operation from plurality of clients 210 to 216. The management operation may include operations of distributively storing objects, reading the objects stored in data nodes, and modifying the read objects. Upon the receipt of the operation request from a client, for example, client 210, global load balancer 220 may authenticate client 210 and select proxy server 250 as a responsible proxy server from plurality of proxy server 250, 252, and 254. Global load balancer 220 may allocate selected proxy server 250 to client 210 as the responsible proxy server. In order to select, global load balancer 220 may refer the locations of client 210 and proxy servers 250, 252, and 254, and the processing load of each proxy server 250, 252, or 254. Global load balancer 220 may select proxy server 250 which is relatively closer to the client and has a less processing load than proxy servers 252 and 254. After selecting, global load balancer 220 may transmit an authentication key such as a token and an address of selected proxy server 250 to client 210.

After allocation, client 210 may access responsible proxy server 250 using the received authentication key and the address of selected proxy server 250. Then, client 210 may request responsible proxy server 250 to perform the management operations such as uploading, downloading, and modifying target objects.

In accordance with embodiments, responsible proxy server 250 may receive a request for performing a management operation from client 210. Responsible proxy server 250 may determine a target data node related to a target object on reference to metadata servers 280 and 282. The target object may denote an object that client 210 may want to manage. The target data node may denote a data node storing the target object. For example, response proxy server 250 may determine first data node 11 as the target data node on reference to a related metadata stored in metadata servers 280 and 282. Then, responsible proxy server 250 may transfer the request of client 210 to the target data node 11.

Accordingly, target data node 11 may receive the request of client 210 through responsible proxy server 250, in accordance with embodiments. Target data node 11 may perform the requested operation and return the operation result to responsible proxy server 250. Responsible proxy server 250 may receive the operation result from target data node 11 and pass the operation result to client 210. Embodiments, however, are not limited thereto. For example, target data node 11 may directly transmit the operation result to client 210 without passing through responsible proxy server 250 in accordance with embodiments.

In embodiments, distributed storage system 200 may include two metadata servers 280 and 282. Metadata servers 280 and 282 may manage metadata together. Particularly, metadata servers 280 and 282 may synchronize the metadata in order to maintain consistency of the metadata. If the metadata are not synchronized to each other, a client may have different operation results for the same operation according to a proxy server allocated to the client.

For example, due to failure in synchronization, second metadata server 282 does not have information on the first data node 11 while first metadata server 280 has information on the first data node 11. After the synchronization failure, first proxy server 250 may be allocated with first metadata server 280 and second proxy server 252 may be allocated with second metadata server 282 as a default metadata server. First and second clients request an operation for reading a target object stored in the first data node 11. The first client is allocated with first proxy server 250, and the second client is allocated with second proxy server 252. In this case, first proxy server 250 may be aware of that the target object is stored in first data node 11 because first proxy server 250 refers to first metadata server 280. Accordingly, first proxy server 250 may deliver the request to first data node 11 and first data node 11 may read the target object in response to the request. First data node 11 may transmit the target object to the first client. Accordingly, the first client may receive a correct operation result from first data node 11.

On the contrary, second proxy server 252 may not aware of that the target object is stored in first data node 11 because second proxy server 252 refers to second metadata server 282. When second proxy server 252 is allocated to the second client, the second client may receive an incorrect response from second proxy server 252. The incorrect response may be a message informing the second client that the target object is not stored in first data node 11.

As described above, the reliability of distributed storage system 200 may be degraded due to the failure in synchronization. In an embodiment, metadata servers 280 and 282 may be synchronized to each other in order to overcome such a problem. Embodiments, however, are not limited thereto. For example, metadata servers 280 and 282 may refer the same metadata database, in accordance with embodiments. In this case, a bottle neck problem may arise because both of metadata servers 280 and 282 refer the same metadata database. However, additional synchronization process may not be required. In accordance with embodiments, a plurality of proxy servers may be effectively supported without additional synchronization of the metadata servers.

Throughout the specification, a target object may denote an object that a client wants to search for or store. A target data node may denote a data node storing the target object among a plurality of data nodes. Furthermore, a management operation may denote operations for storing a target object in a target data node, for reading a stored target object from a target data node, for changing a zone group or a target data node storing a target object, and/or for modifying a stored target object. In addition, distributed storage system 200 may be substantially similar to a cloud storage system supporting cloud computing. The distributed storage system may refer to any type of systems that can store the same object in two or more storages to thereby prevent data loss and reduce burdens of storages.

In accordance with embodiments, both of metadata servers 280 and 282 may be maintained in an active state. Plurality of proxy servers 250, 252, and 254 may be allocated with at least one of metadata servers 280 and 282 as a default metadata server. Plurality of proxy servers 250, 252, and 254 may be aware of own default metadata server based on an initial setting property. Thus, plurality of proxy servers 250, 252, and 254 may detect a physical location of a target object using the default metadata server unless the default metadata server is in an inactive state. Accordingly, metadata servers 280 and 282 may be alternately allocated to plurality of proxy servers 250, 252, and 254 at an initial stage. In this manner, each one of metadata servers 280 and 282 may be allocated with a similar number of proxy servers. Accordingly, metadata servers 280 and 282 may have similar processing loads.

Figure 3:
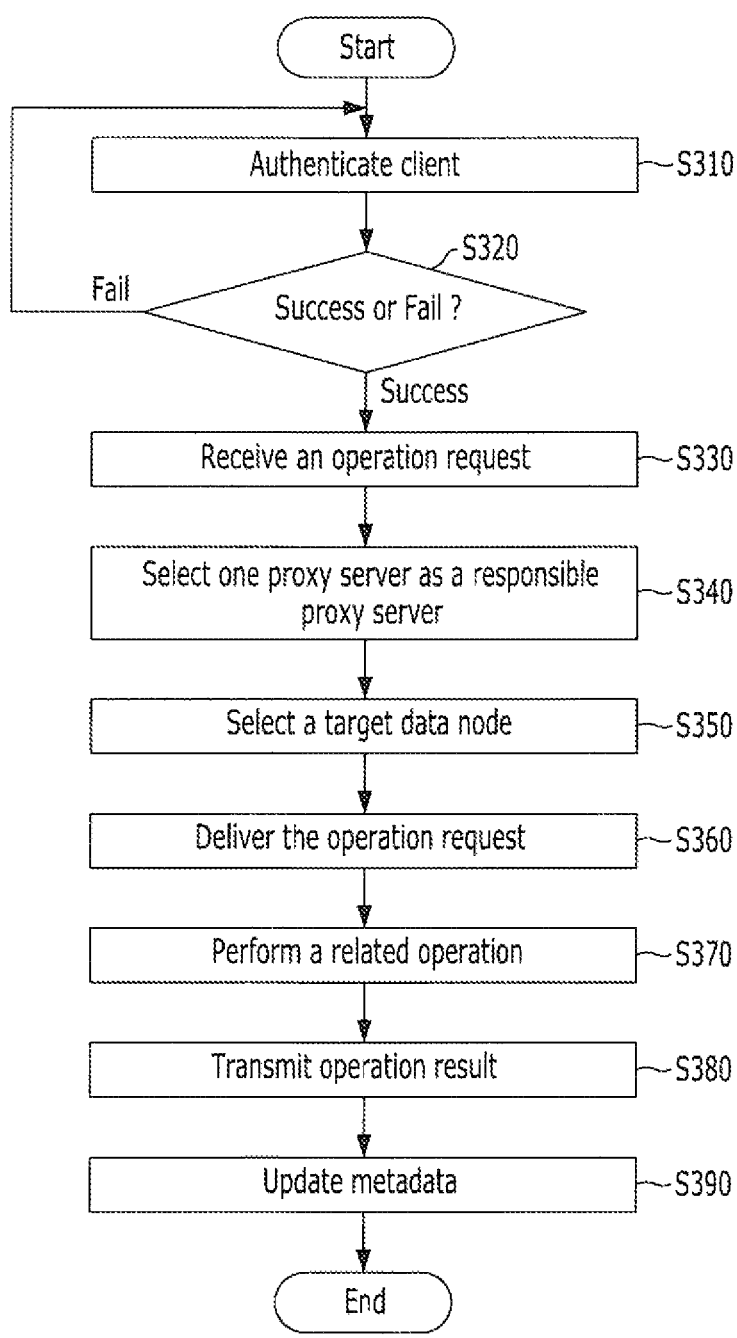
FIG. 3 illustrates a method for managing objects in a distributed storage system including, In accordance with embodiments.

FIG. 3 illustrates a method for managing objects in a distributed storage system including a plurality of proxy servers, in accordance with embodiments. When a client accesses a distributed storage system, a client may be authenticated S310. For example, global load balancer 220 may authenticate client 210 accessing distributed storage system 200. However, embodiments are not limited thereto. In accordance with embodiments, an authentication server (not shown) may authenticate clients accessing the distributed storage system.

A determination may be made as to whether or not client 210 is successfully authenticated S320. When the client is successfully authenticated (Success-S320), an operation request may be received from the client S330. For example, global load balancer 220 may receive an operation request from client 210.

One proxy server may be selected and the selected proxy server may be allocated to the client as responsible proxy server S340. For example, global load balancer 220 may select one proxy server based on the locations of the client and proxy servers 250, 252, and 254 and the processing load of proxy servers 250, 252, and 254 among plurality of proxy servers 250, 252, and 254. For example, global load balancer 220 may select proxy server 250 which is relatively close to client 210 and has a less processing load than other proxy servers 252 and 254. After selecting proxy server 250, global load balancer 220 may allocate selected proxy server 250 to the client as the responsible proxy server.

A target data node related to a target object may be determined S350. For example, responsible proxy server 250 may determine first data node 11 as the target data node related to the target object. Responsible proxy server 250 may refer to metadata servers 280 and 282 to determine the target data node. Herein, the target data node may be a data node related to a target object that the client wants to manage. For example, when the operation request is for an operation for storing a target object, the target data node may be a data node that the client wants to store the target object. When the operation request is for an operation for reading a target object from a data node, the target data node may be a data node storing the target object. Such determination may be performed by responsible proxy server 250 of client 210. That is, responsible proxy server 250 may determine the target data node among plurality of data nodes 11 to 1n based on the operation request and metadata stored in metadata servers 280 and 282.

After determination, the operation request may be delivered to the determined target data node S360. For example, responsible proxy server 250 may deliver the operation request to target data node 11. The requested operation may be performed S370. For example, target data node 11 may receive the operation request from client 210 through responsible proxy server 250 and perform the request operation.

An operation result may be delivered to one of responsible proxy server 250 and client S380. For example, target data node 11 may transmit the operation result to responsible proxy server 250. Responsible proxy server 250 may deliver the operation result to client 210. Embodiments, however, are not limited thereto. Target data node 11 may directly transmit the operation result to client 210 without passing through responsible proxy server 250.

A related metadata may be updated S370. For example, when the metadata is changed based on the result of the requested operation, one of metadata servers 280 and 282 may update the related metadata. After update, metadata servers 280 and 282 may perform a synchronization operation based on the updated metadata in order to synchronize the metadata stored therein.

Figure 4:
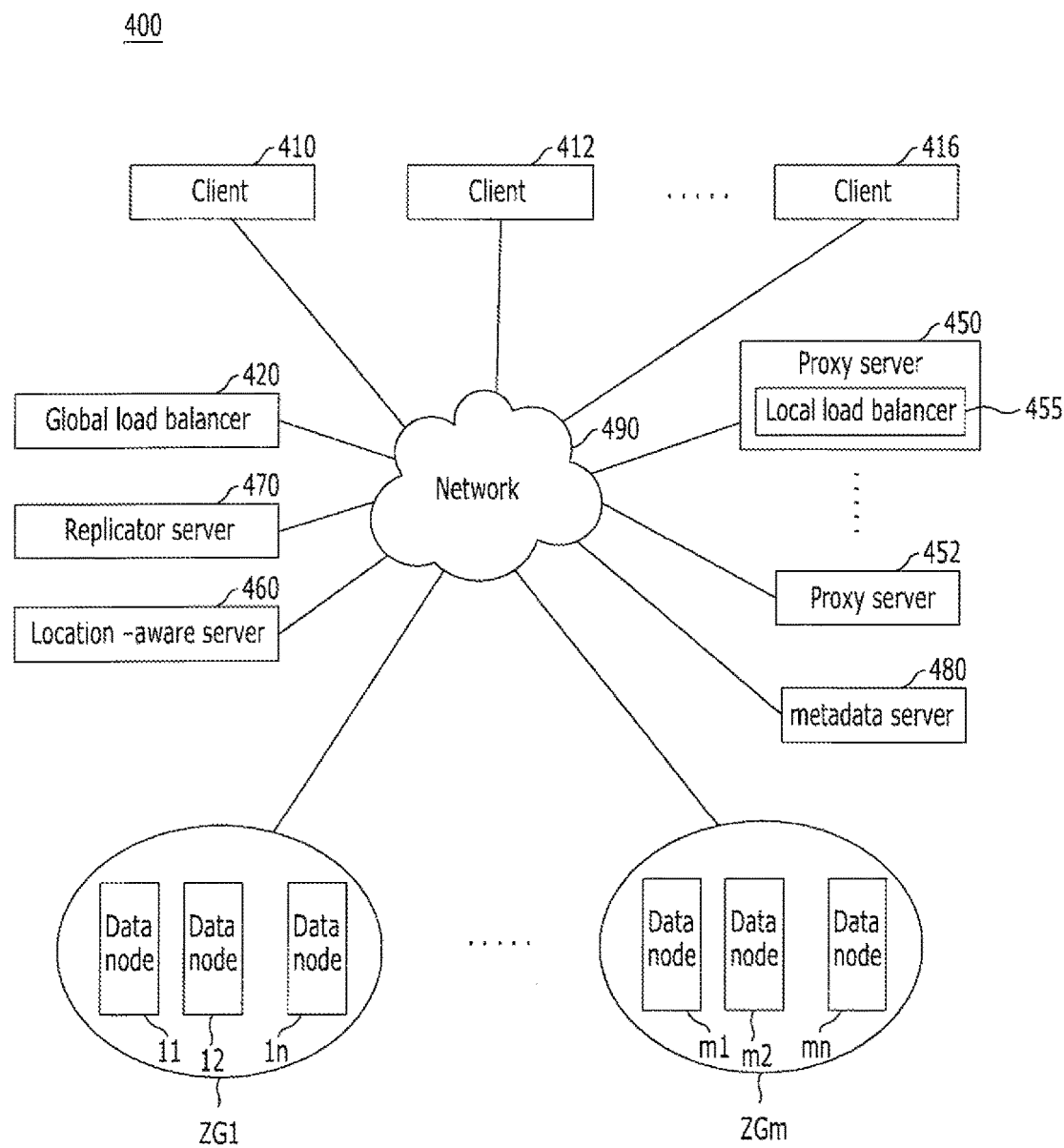
FIG. 4 illustrates a distributed storage system including a plurality of proxy servers, in accordance with embodiments.

FIG. 4 illustrates a distributed storage system including a plurality of proxy servers, in accordance with embodiments. Distributed storage system 400, in accordance with embodiments, may include plurality of clients 410 to 416 and plurality of data nodes 11 to mn. Plurality of clients 410 to 416 and plurality of data nodes 11 to 1n may be coupled through network 490. Distributed storage system 400 may further include global load balancer 620, plurality of proxy servers 450 to 452, location-aware server 460, replicator server 670, and metadata database 480. Furthermore, each one of proxy servers 450 to 452 may include local load balancer 455. Clients 410 to 416, global load balancer 420, and metadata server 480 may have similar functions and perform similar operations as compared to those of distributed storage system 200 of FIG. 2, in accordance with embodiments.

Referring to FIG. 4, data nodes 11 to 1n and m1 to mn may be grouped by a zone, in accordance with embodiments. Distributed storage system 400 may group plurality of data nodes 11 to 1n and m1 to mn based on locations thereof. As shown in FIG. 4, distributed storage system 400 may group plurality of data nodes 11 to 1n and m1 to mn into zone groups ZG1 and ZGm, in accordance with embodiments. Each zone group may include data nodes located in a specific zone. Particularly, data nodes 11 to 1n may be included in first zone group ZG1 and data nodes m1 to mn may be included in $m^{th}$ zone group ZGm, as shown in FIG. 4, in accordance with embodiments. Since plurality of data nodes 11 to 1n and m1 to mn are grouped based on locations thereof, distributed storage system 400 may effectively store an object and replicas thereof in data nodes distributed over a network.

Furthermore, distributed storage system 400 may not store an object and replicas thereof in data nodes belonging to the same zone group. Particularly, distributed storage system 400 may not store identical objects in more than one data node belonging to the same zone group. For example, distributed storage system 400 may store an object in a data node of a first zone group and store replicas of the object in data nodes in zone groups different from the first zone group. Furthermore, distributed storage system 400 may not store replicas of the same object in data nodes belonging to the same zone group. Accordingly, each one of the replicas of an object may be stored in one data node of different zone groups. Metadata may include information on physical locations of an object and replicas thereof. Particularly, the metadata may include information on mapping relation of objects including replicas thereof and corresponding data nodes that store the objects. The above described manner of storing an object and replicas thereof may increase data reliability because replicas of one object are distributively stored in data nodes in different zone groups. For example, when a replica in one zone group is damaged due to errors of a respective network a user can retrieve other replica stored in a data node in different zone group.

In accordance with embodiments, a zone group may be a single data center or a single server rack, but embodiments are not limited thereto. After a zone group is defined and a plurality of data nodes are grouped by each zone group, mapping relation between a data node and a corresponding zone group may be updated in metadata. After updating the metadata, replicas of one object may be replicated in respective data nodes in different zone groups.

Grouping the data nodes into the zone groups may have the following advantages. In accordance with embodiments, clients 410 to 416 and data nodes 11 to 1n and m1 to mn may communicate with each other over network 490. That is, virtual channels may be established between clients 410 to 416 and respective data nodes 11 to mn. However, the virtual channels does not always have the same conditions with respect to pairs of one of clients 410 to 416 and one of data nodes 11 to mn. For example, conditions of such a virtual channel may dynamically change according to various factors including physical distances between a client and a corresponding data node. For example, as the physical distance between a client and a corresponding data node becomes farther, it may take a longer time to transmit/receive a target object because the target object may be relayed through more nodes or gateways.

In addition, the conditions of the virtual channel may change according to an amount of network traffic, and/or performance of network resources configuring a respective virtual channel. As the amount of the network traffic over a respective virtual channel is comparatively great, it is highly likely that transmission collision will occur on the respective virtual channel. As the performance of the network resources is comparatively higher, the transmission/reception speed of the virtual channels may become faster.

In accordance with embodiments, a virtual channel between one of the clients 410 to 416 and a respective one of the data nodes 11 to mn may be selected based on the above described conditions. In order to select the most optimal virtual channel, distributed storage system 400 may refer to the physical distance between clients 410 to 416 and zone groups ZG1 to ZGm. Therefore, an object upload time may be minimized by storing the object in the data node belonging to the zone group located at the shortest distance from the respective client having an object to be stored.

In accordance with embodiments, distributed storage system 400 does not store replicas of the same object in data nodes belonging to the same zone group. In this manner, replicas of the target object may be distributively stored over a plurality of zone groups. Accordingly, data availability and data reliability may be improved. For example, a data center may be defined as one zone group including a plurality of data nodes. Such a data center can malfunction due to power failure. In this case, a user cannot access all data nodes belonging to the data center. Since the distributed storage system stores replicas distributively over a plurality of zone groups, for example, different data centers, a user may access a desired data stored in a different data center.

Referring to FIG. 4, distributed storage system 400 may select target data nodes by a manual selection scheme or an automatic selection scheme, in accordance with embodiments. In the manual selection method, proxy servers 450 to 452 may inquire of a client to select multiple suitable zone groups when the client initially creates an account for an object storage service. The number of zone groups to select may be determined according to the number of replicas. Accordingly, the client may select zone groups as many as the number of replicas of a target object. Furthermore, the client may select zone groups according to priorities of zone groups. Since the client want to store a different number of replicas according to a target object, the client may want to select zone groups as many as the maximum number of replicas to store. Thereafter, when the client wants to change zone groups to store the replicas, the client requests proxy servers 450 and 454 to change the zone group. When proxy servers 450 and 452 accept the request from the client, proxy servers 450 and 452 may store a replica in a target data node belonging to a changed suitable zone group.

The priorities may be determined based on a client preference of the selected target zone groups. Furthermore, the priorities may be determined based on the locations of the client and the zone groups and the data nodes, but embodiments are not limited thereto. Such priorities may denote a ranking of each data node or each zone group. The priorities may indicate a suitability level of a data node for storing a target object, as compared to other data node or other zone group.

The priorities may include a zone group priority and a data node priority. The zone group priority may denote a suitability level of a respective zone group for storing a target object, as compared to other zone group. The data node priority may denote a suitability level of a respective data node for storing a target object, as compared to other data node. Such priorities may be determined based on a client preference of a data node zone or a data node for a target object. Furthermore, the priorities may be determined automatically by proxy servers 450 and 452 or location-aware server 460.

In the automatic selection method, the location-aware server 460 may automatically select a zone group. For example, when an authenticated client inquires of responsible proxy server 450 about a target data node to store a target object, responsible proxy server 450 may inquire of location-aware server 460 to select the most suitable zone groups for the target data nodes.

Location-aware 460 may use various types of information to determine locations of clients. Typically, location-aware 460 may use an IP address of a client to determine the physical location of the client. Location-aware server 460 may select multiple zone groups as many as the number of replicas of a target object in response to a request from responsible proxy server 450. Then, location-aware server 460 may transmit a list of the selected zone groups to responsible proxy server 450.

In FIG. 4, location-aware server 460 may be a server independent from proxy servers 450 and 452, but embodiments are not limited thereto. Location-aware server 460 may be physically integrated with one of proxy server 450 and 452, in accordance with embodiments.

After selecting the target zone groups, responsible proxy server 450 or location-aware server 460 may select a target data node per each one of the selected zone groups. When location-aware server 460 selects the target data node, location-aware server 460 may select a data node closest to a client from data nodes belonging to the selected target zone group. In order to select the target data node, location-aware server 460 may refer to metadata database 480.

When responsible proxy server 450 selects the target data node, responsible proxy server 450 may use local load balancer 455. For example, responsible proxy server 450 may check status of data nodes belonging to each one of zone groups and select a data node having an optimal condition. In FIG. 4, local load balancer 455 is illustrated as being included in responsible proxy server 450, but embodiments are not limited thereto.

Furthermore, responsible proxy server 450 may manage a metadata that contains information on data nodes belonging to each one of the zone groups. Responsible proxy server 450 may determine, in advance, a weight of each data node based on a storage capacity of each data node for load balancing. Responsible proxy server 450 may select one of data nodes based on the weights thereof. Accordingly, load balancing may be maintained among data nodes in a corresponding zone group.

As described above, distributed storage system 400 may include plurality of proxy servers 450 and 452. Accordingly, distributed storage system 400 may have improved stability as compared to a distributed storage system having single proxy server. Furthermore, distributed storage system 400 can easily expand the processing power of proxy servers. Accordingly, the processing power of distributed storage system 400 may be also easily expandable, in accordance with embodiments.

Since a target data node may be selected based on a distance between a client and a target data node, the time delay for uploading and downloading a target object may be minimized, in accordance with embodiments. In addition, since a target object and replicas thereof are stored in data nodes belonging to different zone groups, one of the target object and the replicas thereof can be acquired from different zone groups although a network in one of the zone group malfunctions. Accordingly, availability of the target object and the replicas thereof and reliability of the distributed storage system may be further improved, in accordance with embodiments.

In accordance with embodiments, a distributed storage system includes a plurality of proxy server. The distributed storage system may include a plurality of data nodes, a plurality of proxy server, and a global load balancer. Each one of the plurality of data nodes may be configured to perform at least one management operation and output an operation result. Each one of the plurality of proxy servers may be configured to perform operations for controlling the plurality of data nodes to perform the at least one management operation in response to an operation request from a respective client. The global load balancer may be configured to select one proxy server from the plurality of proxy servers and allocate the selected proxy server to the respective client as the responsible proxy server. The respective client may perform the management operation through the allocated responsible proxy server.

In embodiments, the global load balancer may select the responsible proxy server from the plurality of proxy servers based on a location of the respective client and locations and processing load of the plurality of proxy servers. The global load balancer may select a proxy server having less processing load and closer to the respective client than the other proxy servers as the responsible proxy server.

In embodiments, the global load balancer authenticates clients accessing the distributed storage system and manages information on locations of the plurality of proxy servers and a number of clients allocated to each one of the plurality of proxy servers. In embodiments, he global load balancer may transmit an authentication key and an address of the responsible proxy server, and the respective client may access the responsible proxy server based on the authentication key and the address of the selected proxy server from the global load balancer.

In embodiments, the responsible proxy server may receive the operation request from the respective client, determine a target data node from the plurality of data nodes based on a metadata, and deliver the operation request to the determined target data node. The target data node may then receive the operation request from the responsible proxy server, perform the at least one management operation in response to the operation request, and transmit the operation result to one of the respective client and the responsible proxy server.

The at least one management operation may include operations for storing a target object in a target data node, for reading a stored target object from a target data node, for changing a target data node storing a target object, and for modifying a stored target object. The target object may be an object that the client want to store, search for, or read, and the target data node may be a data node storing the target object or selected to store the target object.

In embodiments, the distributed storage system may further include a plurality of metadata servers each configured to store and manage a metadata. The metadata may include information on a target object and a target data node storing the target object. A metadata stored in one of the plurality of metadata servers may be synchronized with other metadata stored in other metadata servers, and one of the plurality of metadata servers may be allocated with each one of the plurality of proxy as a default metadata server.

In embodiments, a proxy server may refer to a corresponding default metadata server when the corresponding default metadata server is in an active state. Furthermore, a proxy server may refer to another metadata server when the corresponding default metadata server is in an inactive state.

In accordance with embodiments, a method may be provided for managing objects in a distributed storage system including a plurality of proxy servers. The method may include receiving an operation request from a respective client, selecting one of the plurality of proxy servers as a responsible proxy server and allocating the responsible proxy server to the respective client, and performing at least one management operation through the responsible proxy server.

In the selecting one of the plurality of proxy servers, the responsible proxy server may be selected from the plurality of proxy servers based on locations of the plurality of proxy servers, processing load of each one of the proxy servers, and a location of a respective client. The responsible proxy server may be selected by a global load balancer.

In the selecting one of the plurality of proxy servers, a proxy server having less processing load and closer to the client than other proxy servers may be selected from the plurality of proxy servers as the responsible proxy server.

In the performing at least one management operation through the responsible proxy server, the responsible proxy server may receive the operation request from the respective client, determine a target data node from the plurality of data nodes based on a metadata, and deliver the operation request to the determined target data node. The target data node may receive the operation request from the responsible proxy server, perform the at least one management operation in response to the operation request, and transmit the operation result to one of the respective client and the responsible proxy server.

In embodiments, a metadata may be updated based on the operation result of the at least one management operation. The metadata may include information on a target object and a target data node storing the target object and the metadata is managed and stored by a plurality of metadata servers.

The above-described embodiments of the present invention may also be realized as a program and stored in a computer-readable recording medium such as a CD-ROM, a RAM, a ROM, floppy disks, hard disks, magneto-optical disks, and the like. Since the process can be easily implemented by those skilled in the art to which the present invention pertains, further description will not be provided herein.

The term "coupled" has been used throughout to mean that elements may be either directly connected together or may be coupled through one or more intervening elements.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A distributed storage system comprising:
  a plurality of data nodes, each configured to store objects, search one of the stored objects, and read one of the stored objects as at least one management operation;
  a plurality of proxy servers, connected to respective data nodes through a communication network, configured to control the plurality of data nodes to perform the at least one management for storing, searching and reading objects in response to operation requests from clients including a first client; and
  a global load balancer, connected to the plurality of proxy servers through a communication network, configured to receive a request from the first client, select one proxy server from the plurality of proxy servers based on rules associated with the first client, allocate the selected proxy server to the first client as a responsible proxy server, and transmit an authentication key and information of the selected proxy server to the first client,
  wherein the responsible proxy server allocated to the first client performs all of the first client's requests for management operations of the plurality of data nodes, and
  wherein:
  the responsible proxy server allocated to the first client is configured to:
    receive an operation request from the first client;
    determine a target data node from the plurality of data nodes based on a metadata;
    deliver the operation request to the determined target data node, and
  the target data node is configured to:
    receive the operation request from the responsible proxy server;
    perform the at least one management operation in response to the operation request; and
    transmit the operation result to one of the first client and the responsible proxy server.

2. The distributed storage system of claim 1, wherein the global load balancer select the responsible proxy server from the plurality of proxy servers based on a location of the first client and locations and processing load of the plurality of proxy servers.

3. The distributed storage system of claim 1, wherein the global load balancer selects a proxy server having less processing load and closer to the first client than the other proxy servers as the responsible proxy server.

4. The distributed storage system of claim 1, wherein the global load balancer authenticates clients accessing the distributed storage system and manages information on locations of the plurality of proxy servers and a number of clients allocated to each one of the plurality of proxy servers.

5. The distributed storage system of claim 1, wherein:
  the global load balancer transmits a token and an address as the authentication key and the information of the responsible proxy server; and
  the first client accesses the responsible proxy server based on the authentication key and the address of the selected proxy server from the global load balancer.

6. The distributed storage system of claim 1, wherein:
  the at least one management operation includes operations for storing a target object in a target data node, for reading a stored target object from a target data node, for changing a target data node storing a target object, and for modifying a stored target object;

the target object is an object that the client want to store, search for, or read; and the target data node is a data node storing the target object or selected to store the target object.

7. The distributed storage system of claim 1, further comprising:

a plurality of metadata servers connected to the plurality of data nodes and proxy servers and configured to store, search for, and read a metadata, wherein the metadata includes information on a target object and a target data node storing the target object.

8. The distributed storage system of claim 7, wherein:

a metadata stored in one of the plurality of metadata servers is synchronized with other metadata stored in other metadata servers; and one of the plurality of metadata servers is allocated with each one of the plurality of proxy as a default metadata server.

9. The distributed storage system of claim 8, wherein:

a proxy server refers to a corresponding default metadata server when the corresponding default metadata server is in an active state; and a proxy server refers to another metadata server when the corresponding default metadata server is in an inactive state.

10. The method of claim 9, further comprising:

authenticating the client when the client accesses the distributed storage system.

* * * * *